United States Patent
Skinner et al.

(10) Patent No.: US 9,644,768 B2
(45) Date of Patent: May 9, 2017

(54) EXPANDABLE SEALING MECHANISM

(71) Applicant: Press-Seal Gasket Corporation, Fort Wayne, IN (US)

(72) Inventors: James W. Skinner, Fort Wayne, IN (US); Graham E. Blackwood, Fort Wayne, IN (US); Katherine A. Bergfeld, Waterville, OH (US); Michael R. Miller, Churubusco, IN (US); John M. Kaczmarczyk, Angola, IN (US)

(73) Assignee: PRESS-SEAL CORPORATION, Fort Wayne, IN (US)

( * ) Notice: Subject to any disclaimer, the term of this patent is extended or adjusted under 35 U.S.C. 154(b) by 528 days.

(21) Appl. No.: 13/799,698

(22) Filed: Mar. 13, 2013

(65) Prior Publication Data

US 2014/0191503 A1   Jul. 10, 2014

Related U.S. Application Data

(60) Provisional application No. 61/751,056, filed on Jan. 10, 2013.

(51) Int. Cl.
  *F16L 5/02*     (2006.01)
  *F16L 55/163*   (2006.01)
  (Continued)

(52) U.S. Cl.
  CPC ............ *F16L 5/02* (2013.01); *B29C 45/0055* (2013.01); *B29C 45/14377* (2013.01);
  (Continued)

(58) Field of Classification Search
  CPC . F16L 5/025; F16L 5/10; F16L 41/002; F16L 55/163; F16L 5/02; F16L 41/088
  See application file for complete search history.

(56) References Cited

U.S. PATENT DOCUMENTS 2,487,296 A   11/1949   Bergstrom
2,580,396 A   1/1952    Bluth
(Continued)

FOREIGN PATENT DOCUMENTS

JP          5-18490        1/1993

OTHER PUBLICATIONS

Search Report and Opinion dated Feb. 2, 2015 in corresponding European Application No. 14150438.1.

*Primary Examiner* — James M Hewitt
(74) *Attorney, Agent, or Firm* — Faegre Baker Daniels LLP

(57) ABSTRACT

A sealing assembly has an expansion band having an arcuate band portion and a pair of threaded end portions formed at opposing ends of the arcuate band, in which the arcuate band and threaded end portions are monolithically formed as a single piece. Fixed within respective threaded end portions are a pair of oppositely threaded nuts adapted to receive a bolt having correspondingly oppositely threaded ends. Rotation of the bolt causes the threaded end portions to be simultaneously driven apart or drawn toward one another (depending on the rotation direction of the bolt) to thereby expand or contract the overall outer profile of the arcuate band portion. The monolithically formed expansion band may be made of an inexpensive, non-rusting material such as nylon 66, and glass fibers and/or additives may be employed to impart strength and flexibility.

19 Claims, 13 Drawing Sheets

(51) Int. Cl.
*F16L 41/00* (2006.01)
*F16L 41/08* (2006.01)
*B29C 45/14* (2006.01)
*B29C 45/00* (2006.01)
*B29L 31/26* (2006.01)

(52) U.S. Cl.
CPC ........... *F16L 41/002* (2013.01); *F16L 41/088* (2013.01); *F16L 55/163* (2013.01); *B29C 45/14426* (2013.01); *B29L 2031/26* (2013.01); *Y10T 29/49826* (2015.01)

(56) References Cited

U.S. PATENT DOCUMENTS

| | | | |
|---|---|---|---|
| 2,730,782 A | 1/1956 | Ludwinski | |
| 2,767,455 A | 10/1956 | Schaefer | |
| 2,877,732 A * | 3/1959 | Eaton | 114/22 |
| 3,396,439 A | 8/1968 | Schaub | |
| 3,474,832 A | 10/1969 | Broadhead et al. | |
| 3,537,147 A | 11/1970 | Pfeuffer | |
| 4,246,690 A | 1/1981 | Meckstroth et al. | |
| 4,310,956 A | 1/1982 | Meckstroth et al. | |
| 4,341,931 A | 7/1982 | Paulve | |
| D273,841 S | 5/1984 | Chace | |
| D289,141 S | 4/1987 | Tunno et al. | |
| 4,819,307 A | 4/1989 | Turner | |
| 4,872,780 A | 10/1989 | Bowman | |
| D304,676 S | 11/1989 | Glynn | |
| 4,956,898 A | 9/1990 | Miyamura et al. | |
| D315,306 S | 3/1991 | Reister | |
| 5,044,822 A * | 9/1991 | Moss | 405/52 |
| 5,184,912 A | 2/1993 | Bowman et al. | |
| 5,316,407 A | 5/1994 | Miller | |
| 5,474,396 A | 12/1995 | Bravo | |
| 5,540,978 A | 7/1996 | Schrenk | |
| 5,738,359 A | 4/1998 | Gundy | |
| 5,743,673 A | 4/1998 | Bravo | |
| 5,787,555 A | 8/1998 | Chen | |
| 5,809,619 A | 9/1998 | Schaub | |
| 5,851,038 A | 12/1998 | Robinson et al. | |
| 5,956,817 A | 9/1999 | Chen | |
| D424,566 S | 5/2000 | Baker | |
| 6,152,455 A | 11/2000 | Brockway et al. | |
| D442,852 S | 5/2001 | Gopalraja et al. | |
| D442,853 S | 5/2001 | Gopalraja et al. | |
| 6,305,054 B1 * | 10/2001 | Imes et al. | 24/276 |
| 6,805,359 B2 | 10/2004 | Neuhaus et al. | |
| 6,866,301 B2 | 3/2005 | Brockway | |
| 6,953,194 B2 | 10/2005 | Brockway | |
| 7,146,689 B2 | 12/2006 | Neuhaus et al. | |
| D546,666 S | 7/2007 | Mohlin et al. | |
| 7,243,956 B2 | 7/2007 | Brockway | |
| 7,263,746 B2 * | 9/2007 | Neuhaus et al. | 24/279 |
| D559,095 S | 1/2008 | Lalancette et al. | |
| 7,500,701 B2 | 3/2009 | Lalancette et al. | |
| D600,107 S | 9/2009 | Stewart et al. | |
| D609,997 S | 2/2010 | Andersson | |
| D625,175 S | 10/2010 | Balcell Comas | |
| D632,555 S | 2/2011 | Sarkissian | |
| D647,394 S | 10/2011 | Taylor | |
| D653,103 S | 1/2012 | Tomasi et al. | |
| D653,529 S | 2/2012 | Tomasi et al. | |
| D653,530 S | 2/2012 | Hammond et al. | |
| D654,785 S | 2/2012 | Clorley | |
| D676,738 S | 2/2013 | Hammond et al. | |
| D703,033 S | 4/2014 | Karlsson | |
| 2005/0006853 A1 | 1/2005 | Neuhaus et al. | |
| 2006/0033330 A1 | 2/2006 | Neuhaus et al. | |
| 2009/0051125 A1* | 2/2009 | Skinner | 277/609 |
| 2014/0191503 A1 | 7/2014 | Skinner et al. | |

\* cited by examiner

FIG_1

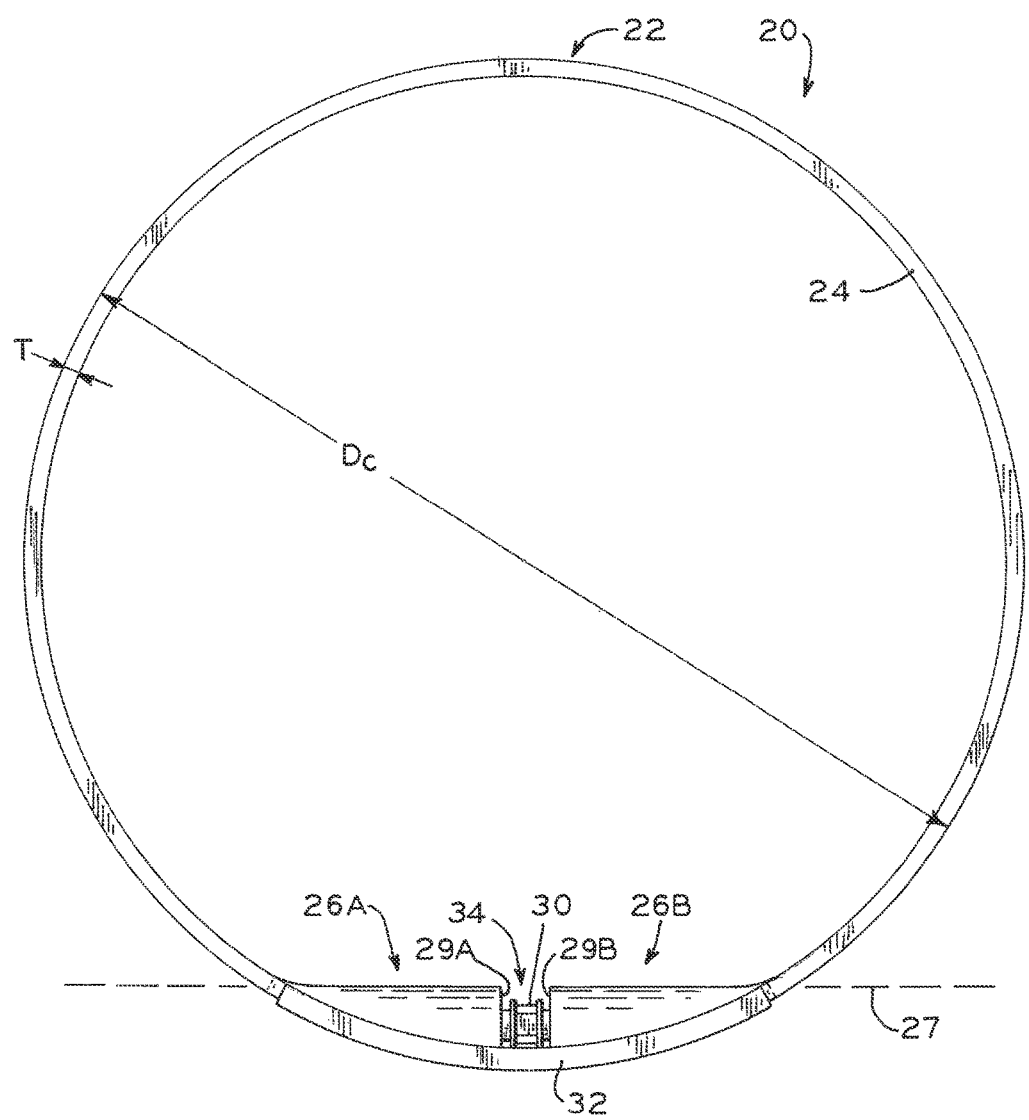
FIG_3

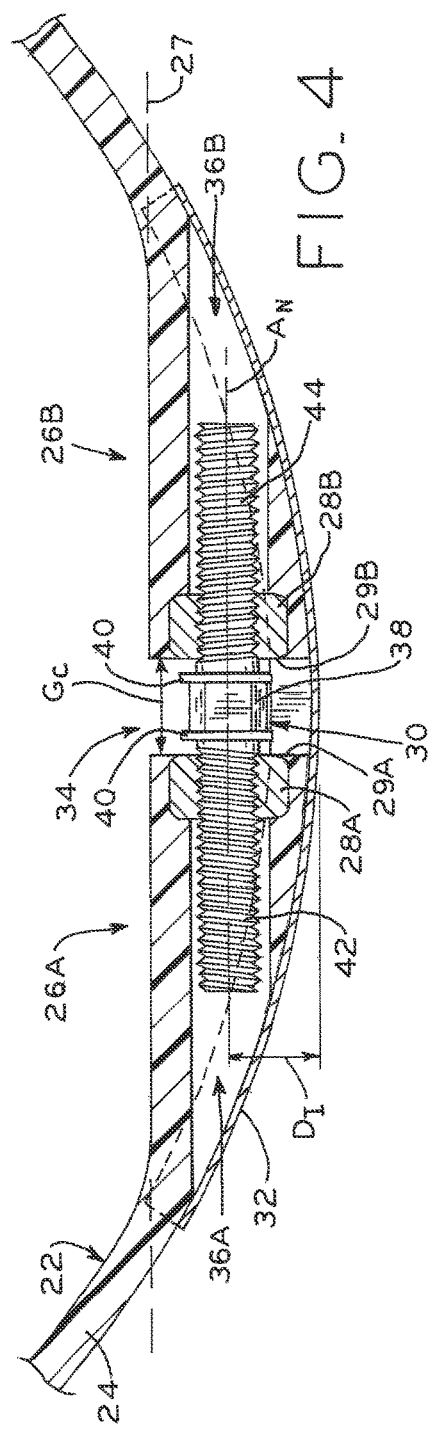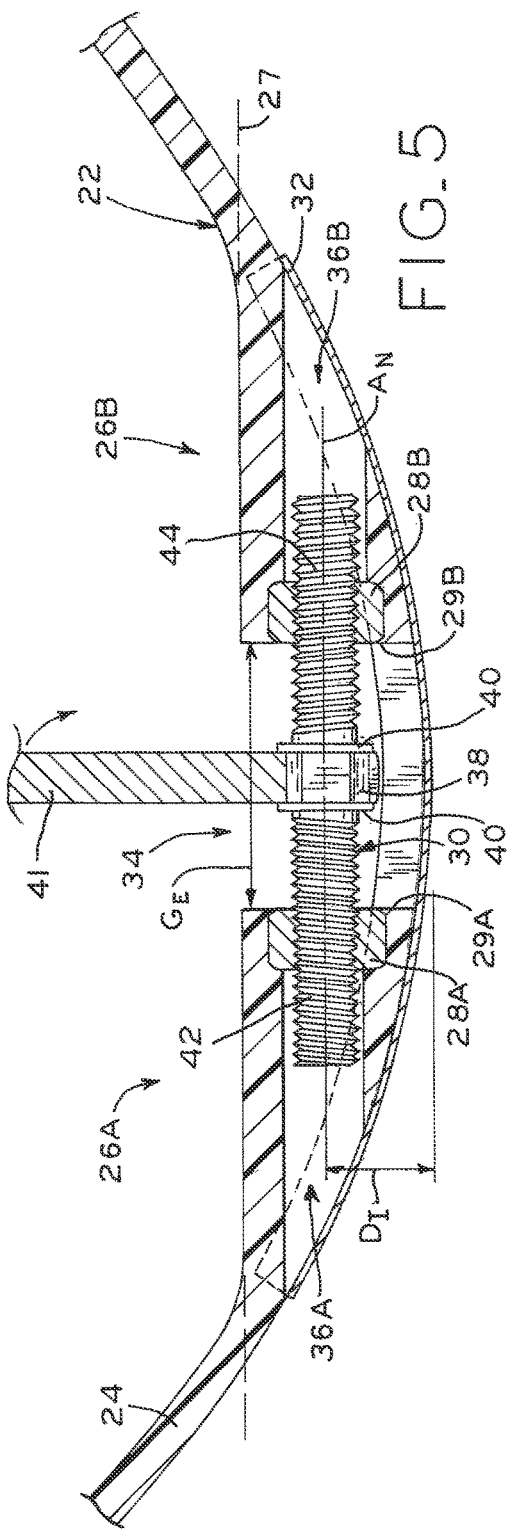

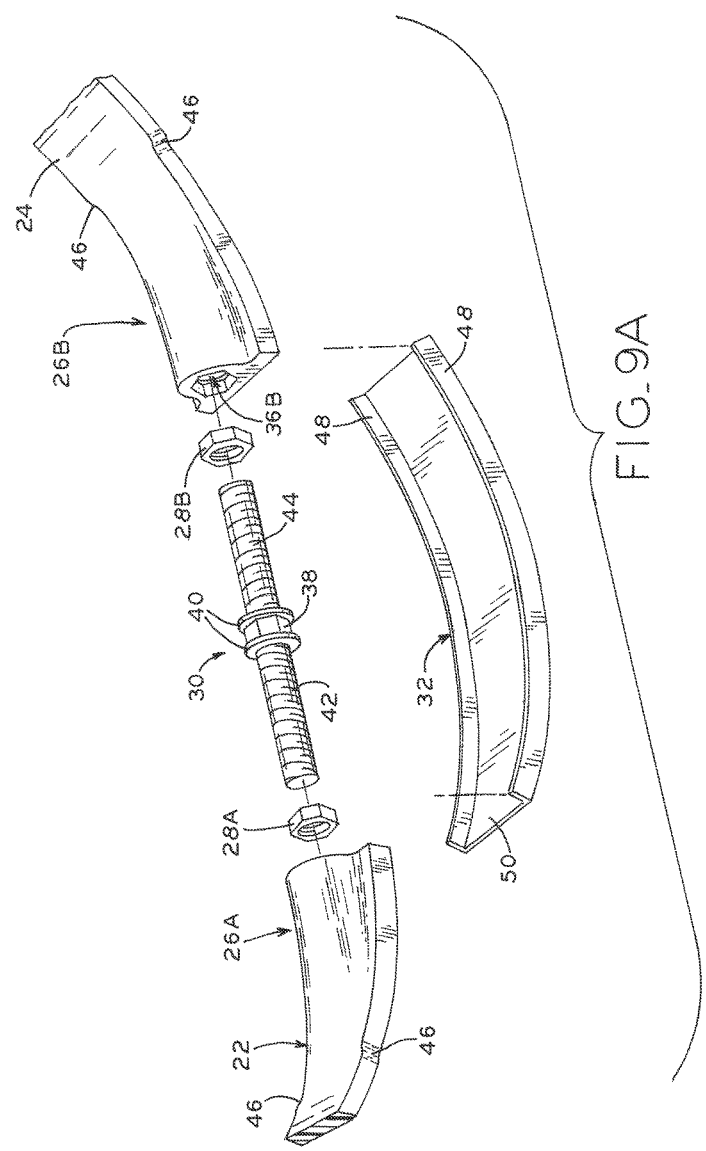

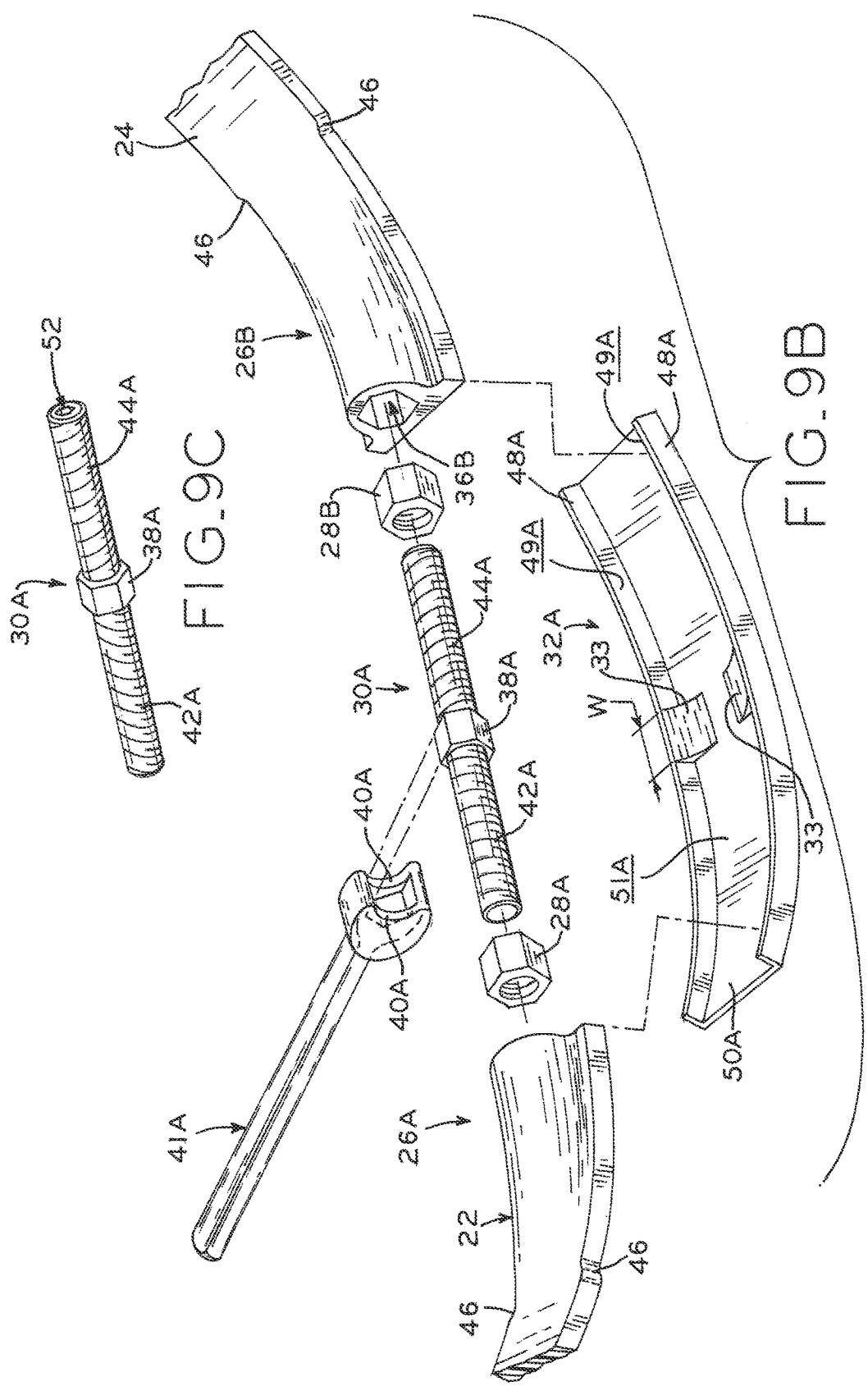

FIG_14

EXPANDABLE SEALING MECHANISM

CROSS REFERENCE TO RELATED APPLICATIONS

The present application claims the benefit under Title 35, U.S.C. Section 119(e) of U.S. Provisional Patent Application Ser. No. 61/751,056, filed Jan. 10, 2013 and entitled EXPANDABLE SEALING MECHANISM, the entire disclosure of which is hereby expressly incorporated herein by reference.

BACKGROUND

1. Technical Field

The present disclosure relates to an expandable sealing mechanism, and associated method, for sealingly compressing a gasket or seal against an annular wall of a rigid structure. More particularly, the present disclosure relates to sealing structures and arrangements for sealingly connecting an opening in a manhole wall to a pipe entering or exiting the manhole wall through the opening.

2. Description of the Related Art

In underground pipe systems, it is often necessary to connect a pipe in a sealed manner within an opening in the wall of a rigid structure, such as a manhole wall. Typically, a flexible elastomeric seal or gasket is placed within the opening in the wall, followed by fitting an expansion ring against the interior surface of the gasket. Thereafter, a suitable expansion mechanism is used to radially expand the expansion ring and lock same in an expanded condition in which the gasket is sealingly compressed between the expansion ring and the opening in the wall of the structure. A pipe is inserted through the gasket, and one or more external clamps are installed around a portion of the gasket which extends from the wall to sealingly compress the extending portion of the gasket between the clamps and the outer surface of the pipe. In this manner, a sealed connection is made between the pipe and the structure.

An alternative application for a sealing device including a gasket/expansion ring combination is underground pipes which are used in municipal water and sewer systems, for example. Such underground pipes typically include bell and spigot ends that are attached to one another in a sealed manner. Typically, either the spigot end or the bell end of such pipes includes a rubber seal which is compressed between the ends of the pipes to provide a sealed joint when the spigot end of one pipe is inserted into the bell end of another pipe. Occasionally, these primary joint seals between adjacent pipes may leak after installation in the field, requiring a secondary sealing assembly to seal the connection.

Yet another application for sealing devices is in the upper openings of manhole systems, which typically facilitate access to the underground pipes from street level. For example, the manhole chimney and riser structure may have seams through which ground water or other surrounding fluids can seep. In some cases, it is desirable to prevent the ingress of these ambient fluids through these seams in the manhole chimney.

One known sealing mechanism includes an expansion ring having a ratcheting engagement between overlapping ends of the ring. When the ends of the ring are forced in opposite directions from one another as the ring is radially expanded, ratchet teeth on the ring ends sequentially engage one another, wherein the expansion ring may be sequentially expanded in an incremental manner into multiple locked positions. A separate tool is used to engage the opposite ends of the expansion ring and to drive same apart from one another.

What is needed is an improved sealing assembly that can be installed within an annular opening, such as an opening in the wall of a manhole, to provide a reliable seal.

SUMMARY

The present disclosure provides a sealing assembly with an expansion band having an arcuate band portion and a pair of threaded end portions formed at opposing ends of the arcuate band, in which the arcuate band and threaded end portions are monolithically formed as a single piece. Fixed within respective threaded end portions are a pair of oppositely threaded nuts adapted to receive a bolt having correspondingly oppositely threaded ends. Rotation of the bolt causes the threaded end portions to be simultaneously driven apart or drawn toward one another (depending on the rotation direction of the bolt) to thereby expand or contract the overall outer profile of the arcuate band portion. The monolithically formed expansion band may be made of an inexpensive, non-rusting material such as nylon 66, and glass fibers and/or additives may be employed to impart strength and flexibility.

The sealing assembly of the present disclosure can be combined with a seal or gasket to provide a robust, cost-effective solution for sealing a connection between a concrete structure, such as a manhole wall, and an adjacent pipe entering or exiting the manhole wall. An alternative gasket/sealing assembly combination may be used for internally sealing a connection between a pair of adjacent pipes. Yet another alternative gasket/sealing assembly combination may be used to sealing a connection about the upper end of a concrete structure, such as providing a seal across a manhole frame and manhole chimney (as well as any intervening spacer rings therebetween).

In one form thereof, the present disclosure provides a sealing assembly including: an expansion band having an arcuate band portion, a pair of threaded end portions monolithically formed with the arcuate band portion and disposed at opposing ends of the arcuate band portion, a pair of first threaded components having opposing threads and respectively captured within the pair of threaded end portions, and a second threaded component including oppositely-threaded ends respectively threadably engaged with the pair of first threaded components. Rotation of the second threaded component in a first direction causes the pair of threaded end portions to be simultaneously driven apart from one another to thereby expand a diameter of the arcuate band portion.

In another form thereof, the present disclosure provides a method of making an expansion band, the method including: placing a pair of oppositely-threaded first threaded components into a mold cavity, the mold cavity shaped to create an expansion band having an arcuate band portion, and a pair of end portions monolithically formed with the arcuate band portion and disposed at opposing ends of the arcuate band portion. The method further includes: injecting a molten material into the mold cavity, such that the molten material flows around the first threaded components and throughout the mold cavity, wherein the molten material forms the arcuate band portion and the pair of end portions with the pair of oppositely-threaded first threaded components respectively captured within the end portions when the molten material hardens; and threadably engaging a second threaded component with the pair of oppositely-threaded first threaded components, the second threaded component having oppositely-threaded ends adapted to simultaneously drive apart the pair of end portions to thereby expand a diameter of the arcuate band portion.

BRIEF DESCRIPTION OF THE DRAWINGS

The above-mentioned and other features and advantages of this invention, and the manner of attaining them, will become more apparent and the invention itself will be better understood by reference to the following descriptions of embodiments of the invention taken in conjunction with the accompanying drawings, wherein:

FIG. 3 is a front elevation view of the sealing assembly of FIG. 2;

FIG. 4 is an enlarged, partial cross-sectional view of a portion of the sealing assembly shown in FIG. 2, shown in a contracted state;

FIG. 5 is an enlarged, cross-sectional view of a portion of the sealing assembly shown in FIG. 2, shown in an expanded state;

FIG. 9A is a partial, exploded perspective view of the sealing assembly shown in FIG. 2, illustrating an assembly of components which connect to threaded end portions of the expansion band;

FIG. 9B is partial, exploded perspective view of an alternative sealing assembly made in accordance with the present disclosure;

FIG. 9C is a perspective view of an actuation bolt in accordance with the present disclosure;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

1. Introduction

Figure 1:
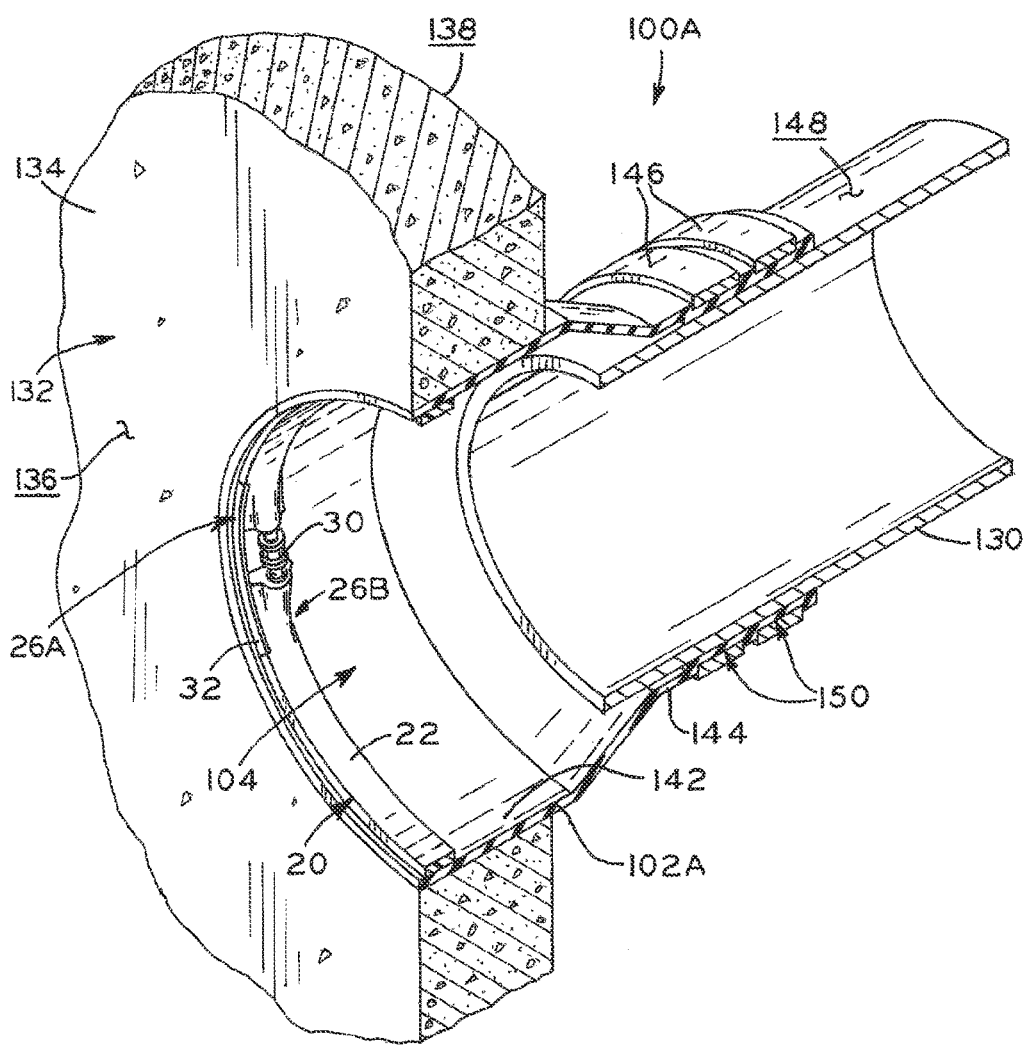
FIG. 1 is a perspective, partial section view of a connection between a concrete structure and a pipe, wherein a wall of the concrete structure includes an opening into which a gasket is sealingly fitted with a sealing assembly according to the present invention, and further showing a pipe sealingly connected to the gasket.

Referring now to FIG. 1, pipe connection assembly 100A in an underground pipe system is shown, in which pipe 130 is connected to a structure 132, such as a manhole riser or monolithic base, for example. Structure 132 may be formed of concrete, fiberglass, or any other suitable rigid material. Structure 132 includes wall 134 having interior surface 136 defining the interior of structure 132, and exterior surface 138 defining the exterior of structure 132. Additionally, wall 134 includes opening 104 formed therein. An annular seal or gasket 102A includes a first portion 142 disposed within opening 104 of wall 134, and a second portion 144 extending outwardly from first portion 142. Gasket 102A may be made from a flexible, elastomeric material such as rubber or neoprene, for example, and provides a sealing connection between opening 104 in wall 134 of structure 132 and pipe 130.

Figure 2:
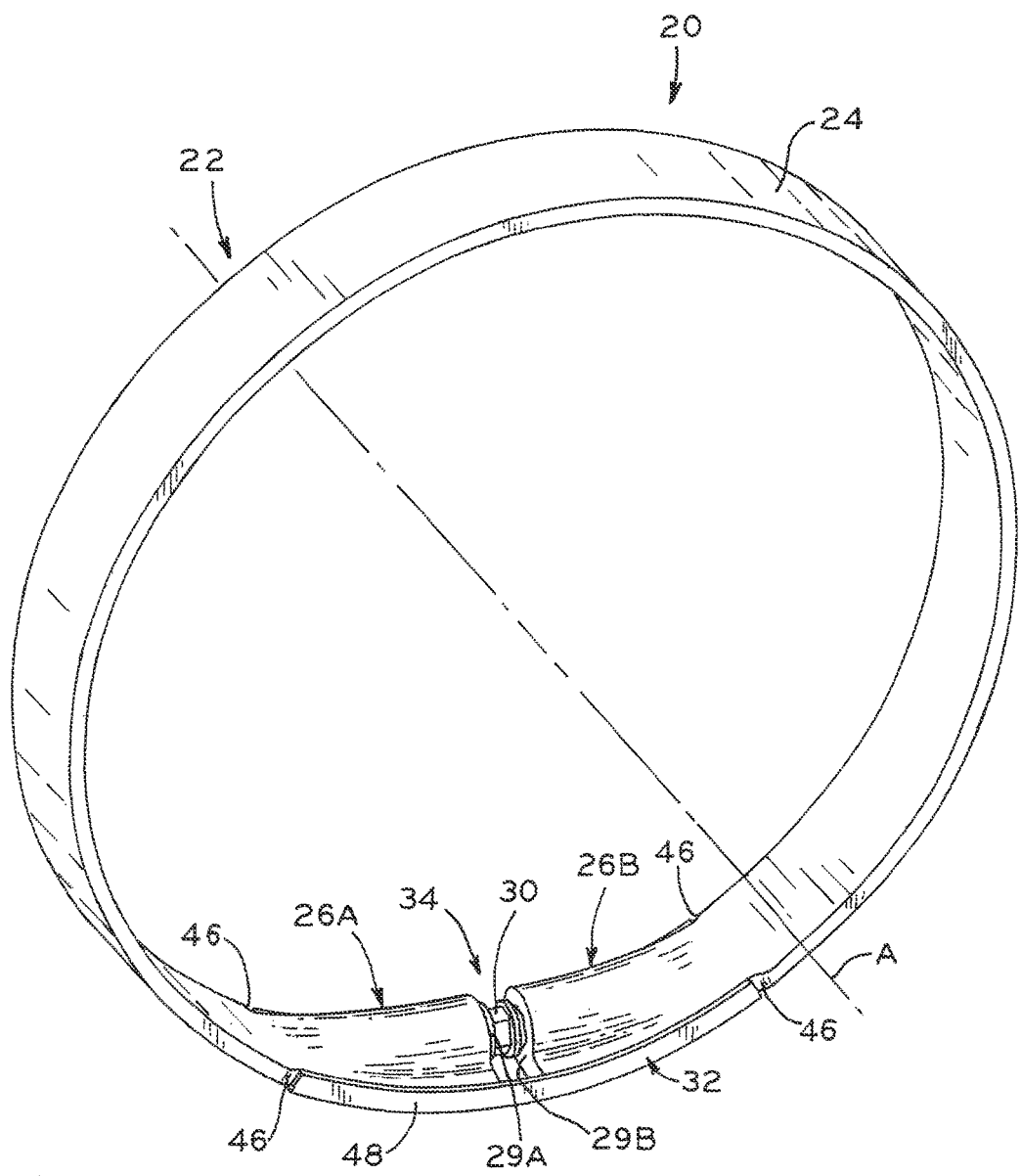
FIG. 2 is a perspective view of a sealing assembly made in accordance with the present disclosure.
Figure 6:
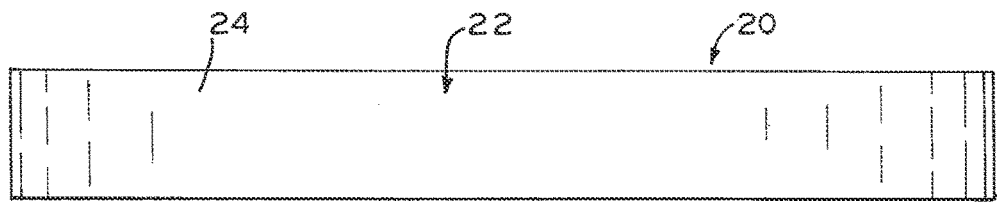
FIG. 6 is a top plan view of the sealing assembly of FIG. 2.
Figure 7:
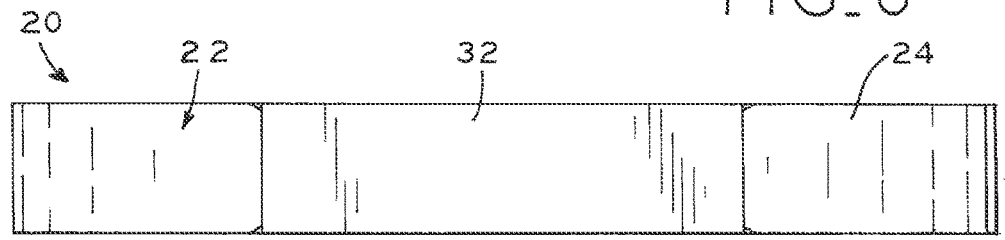
FIG. 7 is a bottom plan view of the sealing assembly of FIG. 2.
Figure 8:
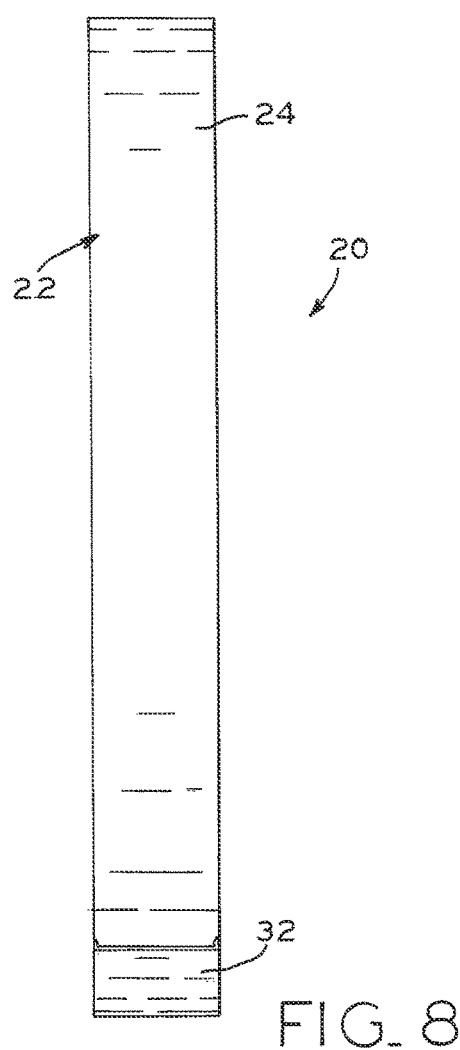
FIG. 8 is a side elevation view of the sealing assembly shown in FIG. 2, it being understood that left and right side views of the sealing assembly are identical.

More particularly, first portion 142 of gasket 102A is sealingly engaged with opening 104 of wall 134 by sealing assembly 20, which generally includes expansion band 22, bolt 30, and oversleeve 32 as described in detail below. Sealing assembly 20 is radially expandable to compress gasket 102A into sealing engagement with opening 104 in wall 134 to provide a fluid tight seal therebetween. As shown in FIG. 2 and described in further detail below, sealing assembly 20 includes expansion band 22 having an arcuate band portion 24 and a pair of threaded end portions 26A, 26B which are monolithically formed as a single material, such as a polymer material, to provide a resilient, effective and cost-effective solution for providing this fluid tight seal.

After first portion 142 (FIG. 1) of gasket 102A is sealingly engaged with opening 104 of wall 134 by sealing assembly 20, second portion 144 of gasket 102A is connected to pipe 130 by inserting pipe 130 through gasket 102A, then installing one or more clamps 146 around second portion 144 of gasket 102A and tightening clamps 146 to compress second portion 144 of gasket 102A into sealing engagement with outer surface 148 of pipe 130 to provide a fluid tight seal therebetween. Second portion 144 of gasket 102A may include annular recessed seats 150 for receipt of clamps 146 to locate clamps 146 on second portion 144 of gasket 102A.

In FIG. 1, only a portion of the length of pipe 130 is shown for clarity, it being understood that pipe 130 typically extends past sealing assembly 20 through opening 104 in wall 134, past interior surface 136 of wall 134, and into the interior of structure 132. Also, sealing assembly 20 as shown in FIG. 1 has threaded end portions 26A, 26B and the associated components, including bolt 30, disposed in a nine o'clock position with respect to opening 104 for clarity. However, end portions 26A, 26B and bolt 30 may be positioned at any desired position around the circumference of opening 104, it being noted that a configuration with end portions 26A, 26B and bolt 30 disposed in a twelve o'clock position is favored in many applications to avoid or minimize contact with fluid. Further, the pipe connection of FIG. 1 may installed in a manner in which second portion 144 of gasket 102A extends inwardly from wall 134, in essentially the opposite manner shown in FIG. 1, such that clamps 146 are disposed within structure 132.

Optionally, first portion 142 of gasket 102A may include an annular expansion band seat (not shown in FIG. 1), similar to expansion band seats 110 shown in FIGS. 14 and 15 and further described below, to provide an annular recessed area to receive expansion band 22 and oversleeve 32 upon creating the sealed connection between first portion 142 of gasket 102A and the inner annular surface of opening 104.

2. Sealing Assembly Construction

Turning now to FIG. 2, a perspective view of sealing assembly 20 is shown in a contracted configuration that is ready for installation at a service site. Sealing assembly 20 includes expansion band 22, which has an arcuate band portion 24 forming a generally cylindrical outer shape and a corresponding circular profile (FIG. 3), and threaded end portions 26A, 26B formed at respective opposing ends of arcuate band portion 24. As used herein, "cylindrical" refers to a shape or structure generally conforming to the shape of a cylinder, it being understood that precise conformance thereto is not necessary for a structure to be considered "cylindrical." For example, an expansion band made in accordance with the present disclosure may be an injection molded part that is considered to be substantially cylindrical in both expanded and contracted configurations, even though one of such configurations may be slightly oblong (e.g., oval or egg shaped as described further below).

Figure 10:
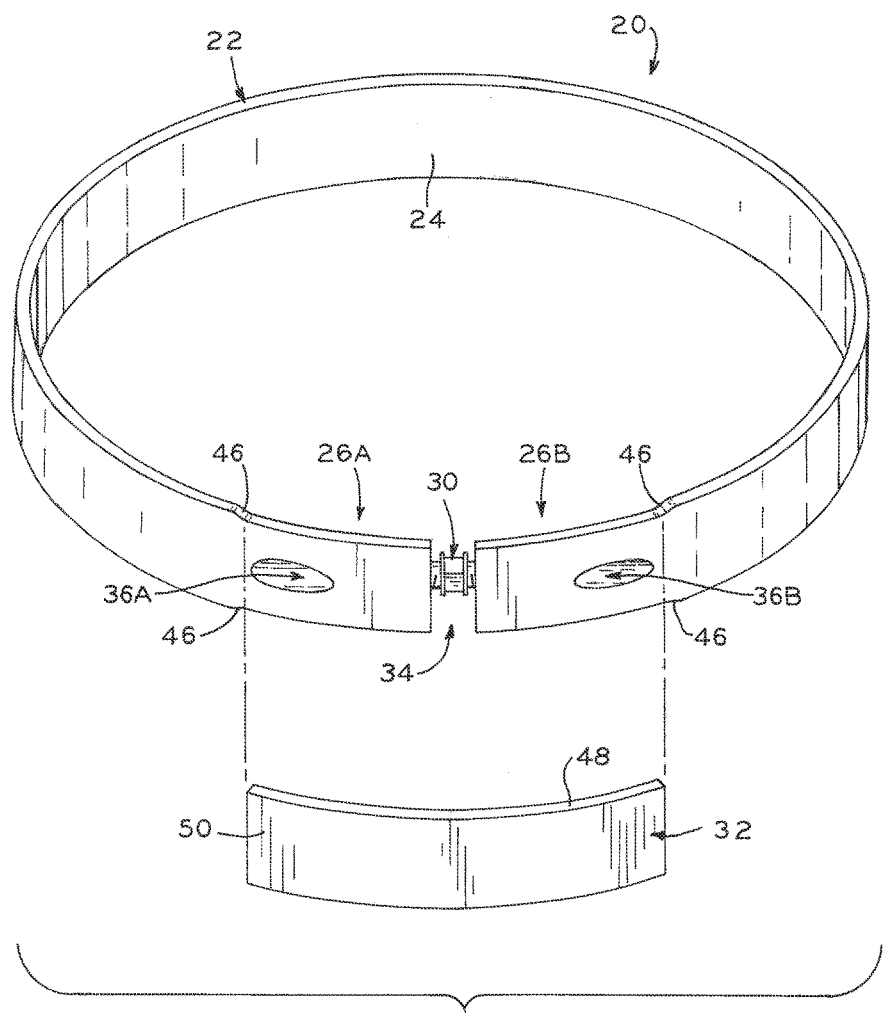
FIG. 10 is a perspective view of the sealing assembly of FIG. 2, illustrating attachment of the oversleeve to cover the threaded end portions.

Bolt 30 is threadably received within nuts 28A, 28B, which are captured within end portions 26A, 26B (shown in FIGS. 4 and 5, and described below). In this manner, bolt 30 connects and affixes end portions 26A, 26B to one another. Oversleeve 32 is received upon an outer surface of expansion band 22 and has a longitudinal, arcuate span which substantially covers both of threaded end portions 26A, 26B and spans a gap 34 between end portions 26A, 26B (FIG. 10). Although gap 34 formed between end portions 26A, 26B interrupts the overall circular profile of expansion band 22, continuity of the circular profile is provided by the correspondingly curved profile of oversleeve 32.

Figure 13:
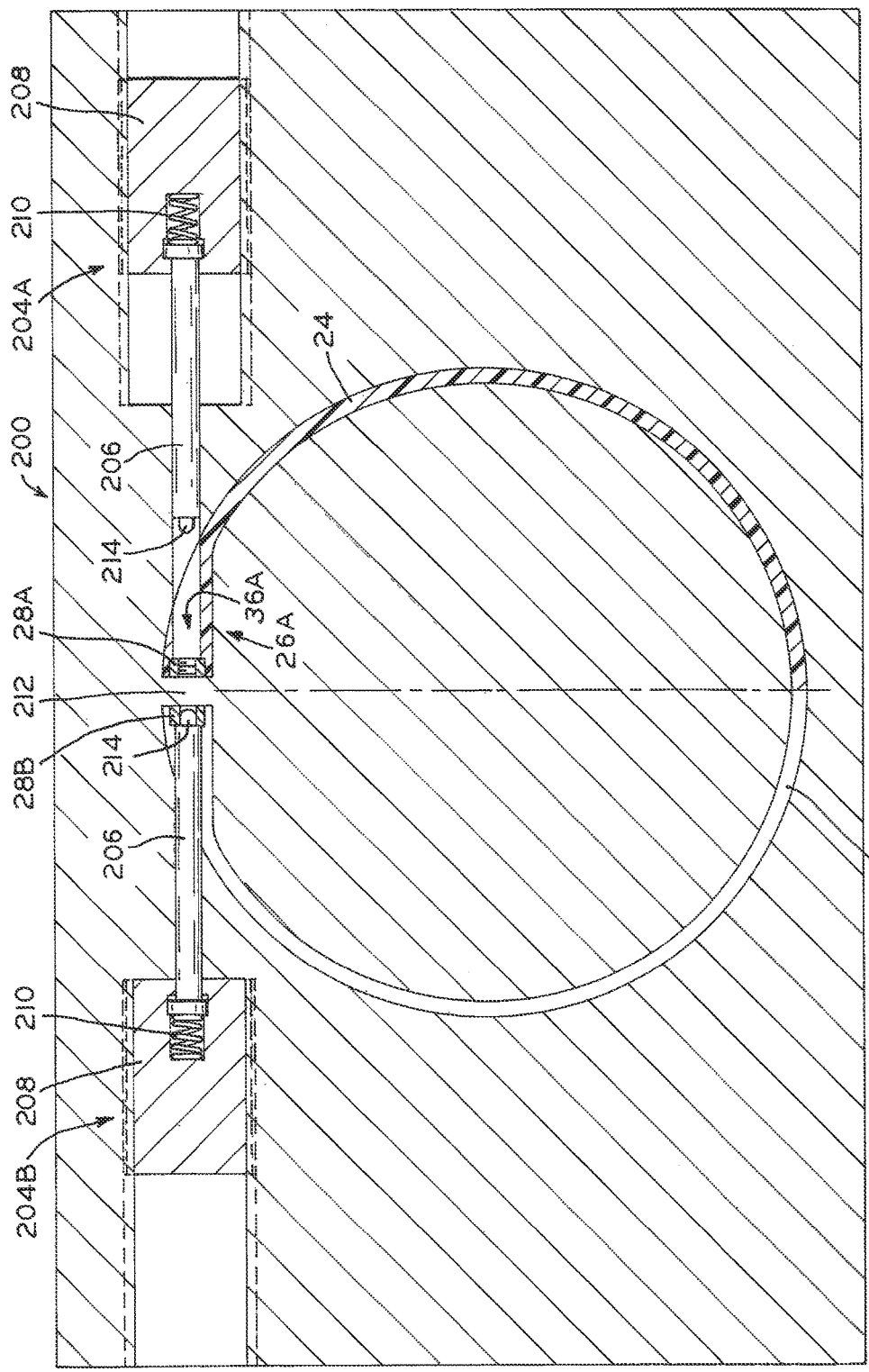
FIG. 13 is a cross-sectional view of an injection molding assembly suitable for forming the expansion band of the sealing assembly shown in FIG. 2.

Expansion band 22 is monolithically formed as a single piece of uniform material throughout its volume, including both arcuate band portion 24 and threaded end portions 26A, 26B. In one exemplary embodiment, expansion band 22 may be formed by injecting a flowable (e.g., molten) material into a cavity of a mold, as shown in FIG. 13 and further described below.

As illustrated in FIGS. 4 and 5, the material used to form expansion band 22 is sufficiently flexible to allow sealing assembly 20 to be reconfigured between expanded and contracted states. Such expansion and contraction is further described below with reference to FIGS. 9A and 10. At the same time, the material of expansion band 22 possesses sufficient strength and rigidity to impart a significant radial outward force upon an adjacent gasket, such that the gasket creates a liquid tight engagement with an adjacent annular inner wall of a pipe or structure. In one exemplary embodiment, the material used to create expansion band 22 is nylon 66, 33% glass filled, and includes up to 1% by weight of an additive operable to increase the flexural modulus of the material. An exemplary additive material may be any polymer addable to the nylon 66 which results in a flexural modulus for expansion band 22 which may be as little as 0.290 GPa, 0.950 GPa, 3.0 GPa or 3.105 GPa and as much as 5.780 GPa, 7.0 GPa, 8.250 GPa or 13.5 GPa. It is contemplated that the flexural modulus of expansion band 22 may have any value within any range defined by any of the foregoing values, depending on the particular application. In one particular exemplary embodiment, the flexural modulus defined by expansion band 22 may be about 4.5 GPa. In another exemplary embodiment, Young's modulus for expansion band 22 may be between 3.0 GPa and 6.0 GPa.

Figure 11:
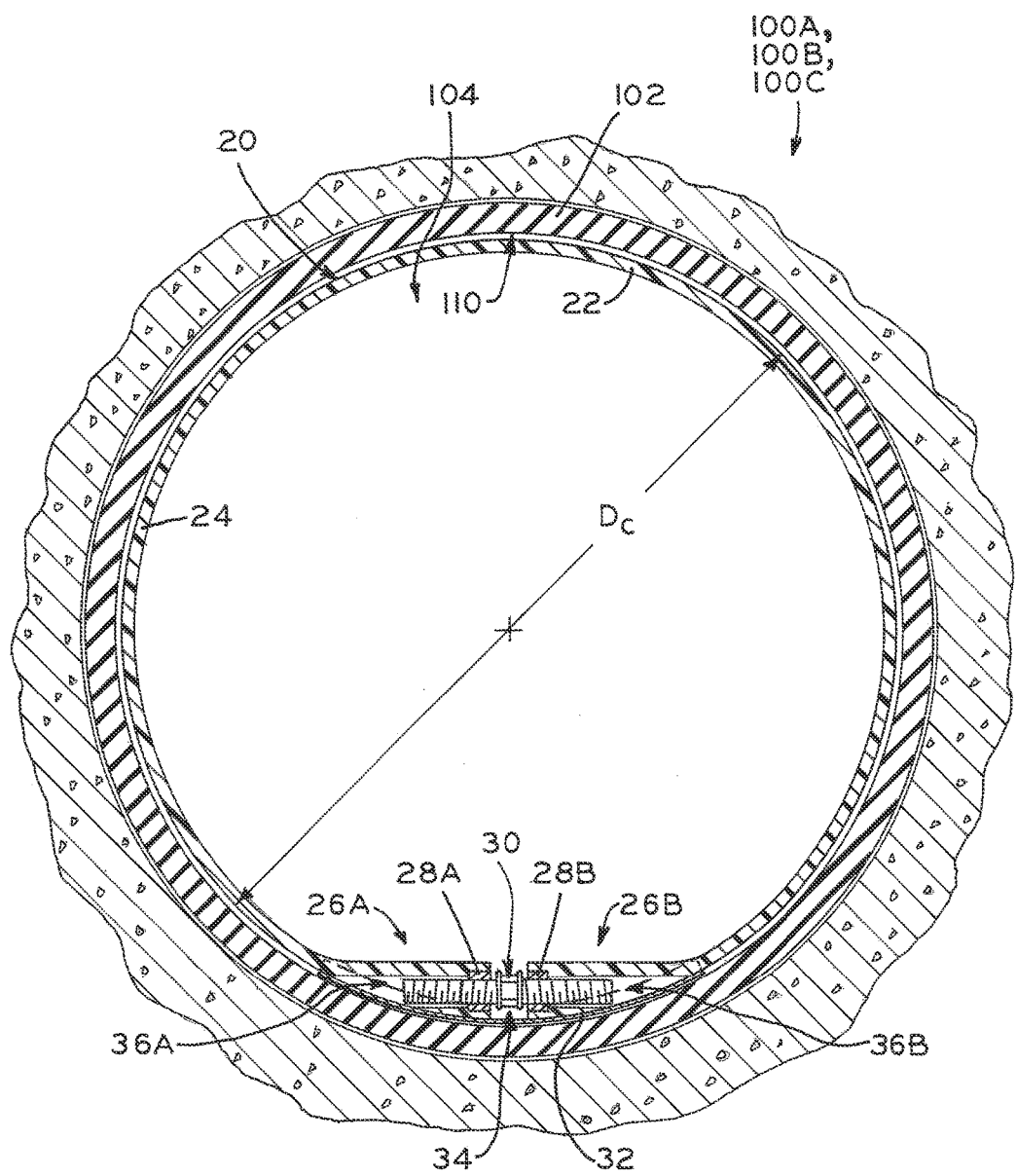
FIG. 11 is a plan, cross-section view of an annular opening, illustrating the sealing assembly in a contracted configuration suitable for initial placement of the gasket.

In one particular embodiment, sealing assembly 20 is designed for use inside an aperture (such as opening 104 shown in FIGS. 11 and 12) having a nominal 12-inch inside diameter. In this application, the effective outside diameter $D_C$, i.e., the diameter of the cylindrical outer surface of expansion band 22 in its contracted state, is about 11.2 inches, which allows sealing assembly 20 to be placed into an 11.5-inch diameter opening (i.e., the diameter of a 12-inch opening 104, less the radial space taken up by a ¼-inch-thick gasket 102, as shown in FIG. 11). For the exemplary nylon 66, 33% glass filled, additive-enhanced material described above, a material thickness T (FIG. 3) for arcuate band portion 24 equaling about 0.24 inches is capable of imparting a sufficient radial outward sealing force to create a liquid tight seal, which also allows sealing assembly 20 to deform sufficiently upon installation to take the form of the adjacent sealing surface of the pipe or manhole opening.

When expanded, sealing assembly 20 has an expanded outside diameter $D_E$ (FIG. 12) of about 11.55 inches, which is slightly larger than the 11.5 inch opening in gasket 102 as assembled in opening 104. Thus, when sealing assembly 20 is installed into opening 104, the oversized expanded diameter $D_E$ compresses gasket 102 and creates a corresponding liquid tight seal between gasket 102 and opening 104.

Upon expansion of sealing assembly 20 from its contracted state to its expanded state, gap 34 is made larger by actuation of bolt 30 as described further below. In the contracted state, the respective terminal end surfaces 29A, 29B of threaded end portions 26A, 26B are separated by contracted gap distance $G_C$ (FIG. 4), while in the expanded state this distance increases to expanded gap distance $G_E$ (FIG. 5). For the above-described embodiment of sealing assembly 20 designed for opening 104 having a 12-inch diameter, contracted distance $G_C$ is about 0.5 inches and expanded distance $G_E$ is about 1.67 inches.

As best seen in FIGS. 2 and 3, arcuate band portion 24 and threaded end portions 26A, 26B are monolithically formed as a single part with threaded end portions 26A, 26B disposed at opposing ends of arcuate band portion 24. The material of end portions 26A, 26B progressively thickens starting at the respective junctions between arcuate band portion 24 and end portions 26A, 26B and advancing toward the terminal end surfaces 29A, 29B of expansion band 22. When viewed in profile as shown in FIG. 3, this thickening causes the interior profile of end portions 26A, 26B to transition from the generally circular shape of the inner diameter of arcuate band portion 24 to the flat and linear profile of end portions 26A, 26B. This flat profile defines chord line 27 extending across a portion of the otherwise circular profile of sealing assembly 20. When viewed from above as shown in FIG. 3, i.e., with a line of sight along longitudinal axis A (FIG. 2) of sealing assembly 20, the progressively thickened material of end portions 26A, 26B is completely contained within the overall circular outer profile defined by expansion band 22 and oversleeve 32, thereby maintaining the cylindrical outer profile of sealing assembly 20.

Turning to FIGS. 4 and 5, the progressive thickening of the material of expansion band 22 in the vicinity of threaded end portions 26A, 26B facilitates the inclusion of bores 36A, 36B therethrough, respectively. Bores 36A, 36B (FIGS. 4 and 5) extend substantially parallel to chord line 27 and are disposed radially inwardly of the cylindrical outer surface of expansion band 22, and are sized to receive threaded portions 42, 44 of bolt 30. Chord line 27 is radially spaced inwardly from the outer cylindrical surface of sealing assembly 20 by a sufficient amount to ensure that a material thickness commensurate of thickness T of arcuate band 24 (FIG. 3) is maintained in the vicinity of bores 36A, 36B and throughout threaded end portions 26A, 26B. At the same time, the radial inward spacing of chord line 27 is kept to a low enough level to avoid excessive protrusion of end portions 26A, 26B into the otherwise circular opening of expansion band 22 and to avoid excessive material thickness in end portions 26A, 26B. This balanced inward spacing of chord line 27 provides an overall flexural modulus in the material around bores 36A, 36B that is commensurate with arcuate band portion 24, thereby promoting consistent distribution of radial outward force when sealing assembly 20 is installed (as described below).

FIG. 2 illustrates that the built-up material at threaded end portions 26A, 26B has a substantially circular cross-section to create a substantially uniform material thickness around each of bores 36A, 36B and nuts 28A, 28B. However, to avoid stress risers resulting from any sharp material corners, the built-up material transitions smoothly from the round cross-section around bores 36A, 36B to the substantially rectangular cross-section at the radially outward area of end portions 26A, 26B. These radially outward areas are shaped as continuations of arcuate band portion 24, and maintain the overall cylindrical outer profile of expansion band 22. The radially inward, thickened areas forming threaded end portions 26A, 26B and defining chord line 27 (FIG. 3) provide structural support for the expansion functionality of sealing assembly 20.

Nuts 28A, 28B are captured within bores 36A, 36B, respectively. As best illustrated in FIGS. 4 and 5, nuts 28A, 28B are disposed flush to respective terminal end surfaces 29A, 29B of threaded end portions 26A, 26B. In addition, the threaded bores formed in nuts 28A, 28B are axially aligned with one another, such that longitudinal axis $A_N$ of bolt 30 coincides with the corresponding longitudinal axes of the threaded bores of nuts 28A, 28B when bolt 30 is threadably received therewithin as illustrated. Additionally, bores 36A, 36B define longitudinal axes which are coaxial with bolt axis $A_N$ when sealing assembly 20 is assembled as shown. This mutual coaxiality of nuts 28A, 28B, bores 36A, 36B, and bolt 30 is maintained regardless of whether sealing assembly 20 is configured in the contracted state (FIGS. 4 and 11) or the expanded state (FIGS. 5 and 10).

Bolt 30 includes a centrally located, hex-shaped wrench engagement portion 38 engageable with wrench 41 (FIG. 5) to turn bolt 30 to expand and contract sealing assembly 20, as described below. In one embodiment, wrench engagement portion 38 may be flanked at each axial end thereof by wrench containment flats 40, which impose a physical barrier to axial sliding of wrench 41 along axis $A_N$ and thereby prevent wrench 41 from sliding axially off of engagement portion 38. Right-hand threaded portion 44 of bolt 30 extends axially away from one of containment flats 40 and into right-hand threaded nut 28B, while left-hand threaded portion 42 of bolt 30 extends axially away from the other of containment flats 40 and into left-hand threaded nut 28A. In an exemplary embodiment, bolt 30 may be formed from 304 stainless steel, which inhibits corrosion in potentially damp environments during service of sealing assembly 20.

In another exemplary embodiment shown in FIG. 9B, bolt 30A may be provided. Bolt 30A is similar to bolt 30 described herein, with structures of bolt 30A having reference numerals analogous to reference numerals used to describe analogous structures of bolt 30, except with "A" appended thereto. However, bolt 30A omits wrench containment flats 40, and instead providing wrench 41A having side shields 40A sized and positioned to be received at either end of wrench engagement portion 38A. When so engaged, wrench 41A cannot move axially with respect to bolt 30A. This embodiment may allow for a larger overall size of wrench engagement portion 38A of bolt 30A.

Referring now to FIG. 9C, bolt 30A may also include recess 52 formed in the terminal axial end surface of right-hand threaded portion 44. Recess 52 is accessible via bores 36B by a tool (not shown), such that the tool can be received in recess 52 and used to rotate bolt 30A in a desired direction. In the illustrated embodiment, recess is hex-shaped and sized to receive an allen wrench. For the exemplary embodiment of sealing assembly 20 usable with 12-inch diameter opening 104, recess 52 may have a dimension across opposing flats of 3/16 inches and an axial depth of 3/16 inches, which in turn minimizes or eliminates any weakening of bolt 30A while providing sufficient size and depth for engagement by a correspondingly sized wrench. In other embodiments, recess may have other shapes such as square, star-shaped, slotted or crosshead, as required or desired for a particular design. Recess 52 facilitates assembly of seal assembly 20, as further described below.

When wrench 41 (or wrench 41A) is rotated in a first direction, bolt 30 (or bolt 30A) simultaneously threads outwardly from both right-hand nut 28B and left-hand nut 28A, thereby spreading threaded end portions 26A, 26B apart from one another and widening gap 34 as shown by a comparison of FIGS. 4 and 5. Conversely, if wrench 41 (or wrench 41A) is rotated in a second, opposite direction, right-hand and left-hand threaded portions 44, 42 of bolt 30 (or bolt 30A) are threaded further into nuts 28A, 28B, respectively, thereby advancing threaded end portions 26A, 26B toward one another and shrinking gap 34. As described in detail below, the expansion of gap 34 is employed during installation of sealing assembly 20.

As illustrated in FIG. 4, threaded portions 42, 44 of bolt 30 are sufficiently short to be fully contained within bores 36A, 36B, respectively, even when sealing assembly 20 is in the fully contracted configuration of FIG. 4, thereby ensuring that the cylindrical outer profile of expansion band 22 is not disrupted by protrusion of threaded portions 42, 44 outwardly from bores 36A, 36B. Concomitantly, bores 36A, 36B are designed with sufficient axial length to receive the full axial length of threaded portions 42, 44 of bolt 30, respectively. The axial lengths of bores 36A, 36B are set by positioning bores 36A, 36B sufficiently radially inwardly (i.e., toward longitudinal axis A of FIG. 2), which also facilitates maintaining a desired material thickness in threaded end portions 26A, 26B as noted above. In the illustrated embodiment suitable for sealing 12-inch diameter openings 104, longitudinal axis $A_N$ of bolt 30 is radially inset by an inset distance $D_I$ (FIGS. 4 and 5) of about 0.43 inches from the outer cylindrical surface defined by expansion band 22.

In an exemplary embodiment, nuts 28A, 28B are made from a 304 stainless steel material, which inhibits corrosion as noted above. Nuts 28A, 28B may also have a knurled outer surface to facilitate firm capture within bores 36A, 36B, respectively, during molding of expansion band 22 (described further below). In addition to knurling, one or more radial fins (not shown) may be formed on nuts 28A, 28B for additional axial fixation within the molded material of threaded end portions 26A, 26B. Further, as best seen in FIGS. 4 and 5, the outer perimeter of nuts 28A, 28B is larger than the inner diameter of bores 36A, 36B, thereby creating a shoulder which inhibits axial movement of nuts 28A, 28B further into bores 36A, 36B respectively. The axial forces placed on nuts 28A, 28B during service of sealing assembly 20 are directed outwardly from bores 36A, 36B, because expansion band 22 is forced outwardly to create a radially outward, compressive force on a gasket. Thus, the shoulders created in bores 36A, 36B operate to inhibit axial movement of nuts 28A, 28B during normal use of sealing assembly 20.

As an alternative to the arrangement of bolt 30 and nuts 28A, 28B described above, it is contemplated that the male and female threaded structures of sealing assembly 20 (i.e., threaded portions 42, 44 of bolt 30 and the correspondingly threaded bores of nuts 28A, 28B respectively) may be reversed. That is to say, rather than capturing nuts 28A, 28B within threaded end portions 26A, 26B of expansion band 22 as shown in the figures and described above, it is contemplated that oppositely threaded studs may be captured within and extend outward from threaded end portions 26A, 26B. In this alternative arrangement, a female threaded elongated nut, tube or standoff having oppositely-threaded inner bores at respective opposite axial ends thereof is threadably received on the studs, such that rotation of the female nut, tube or standoff either expands or contracts gap 34 in similar fashion to sealing assembly described above.

Turning now to FIGS. 9A and 10, oversleeve 32 may be received over expansion band 22 in the vicinity of threaded end portions 26A, 26B to provide continuity of the cylindrical outer surface of expansion band 22. As best seen in FIG. 10, oversleeve 32 has a sufficient arcuate length to completely span and cover gap 34, as well as cover bore 36A and bore 36B. As shown in FIG. 9A, oversleeve 32 has a shallow U-shaped profile corresponding to the generally rectangular profile of arcuate band portion 24 (and the similarly-shaped radially outward areas of threaded end portions 26A, 26B). In order to promote an overall uniform outer surface of sealing assembly 20 while accommodating oversleeve 32, end portions 26A, 26B each include steps 46 to reduce the axial extent of expansion band 22 to compensate for the thickness of sidewalls 48 of oversleeve 32. Optionally, the profile of the radial outward surface of threaded end portions 26A, 26B may be similarly stepped to accommodate base portion 50 of oversleeve 32, though in some applications such a step may not be necessary to provide an effective seal.

In the alternative embodiment shown in FIG. 9B, oversleeve 32A may be provided. Oversleeve 32A is similar to oversleeve 32 described herein, with structures of oversleeve 32A having reference numerals analogous to reference numerals used to describe analogous structures of oversleeve 32, except with "A" appended thereto. However, oversleeve 32A includes a pair of material augmentations 33 spanning the angular junction between inside surface 51A of base portion 50A and the inwardly-facing surfaces of respective sidewalls 48A. As illustrated, augmentations 33 define a convex, curved surface extending from the radial inward surface 49A of each sidewall 48 to inside surface 51A of base portion 50A.

In an exemplary arrangement, augmentations 33 are disposed at about the middle of oversleeve 32A (i.e., equidistant from the circumferential ends of oversleeve 32A). When assembled to expansion band 22 as illustrated, augmentations 33 occupy the space between respective terminal end surfaces 29A, 29B of threaded end portions 26A, 26B. To facilitate this, augmentations define width W that is equal to or less than contracted gap distance $G_C$ between end portions 26A, 26B (FIG. 4). Thus, augmentations provide a rib-like structure that stiffens and strengthens oversleeve 32A, while remaining spatially compatible with expansion band 22 to form a part of sealing assembly 20.

Further detail regarding certain exemplary embodiments of bolt 30 and oversleeve 32 can be found in U.S. Pat. Nos. 6,805,359 and 7,146,689, each assigned to the assignee of the present invention, the entire disclosures of which are expressly incorporated herein by reference.

3. Sealing Assembly Use

Turning now to FIG. 11, sealing assembly 20 is illustrated in an initially-installed position adjacent gasket 102 and within opening 104. Sealing assembly 20 is in the contracted configuration, thereby leaving an annular gap between the cylindrical outer surface of expansion band 22 and the corresponding cylindrical inner surface of expansion band seat 110 of gasket 102. In addition, the outer cylindrical surface of gasket 102 is shown to be spaced slightly from the inner cylindrical surface of opening 104. This radial spacing facilitates easy passage of gasket 102 and sealing assembly 20 into opening 104 for initial positioning.

Figure 12:
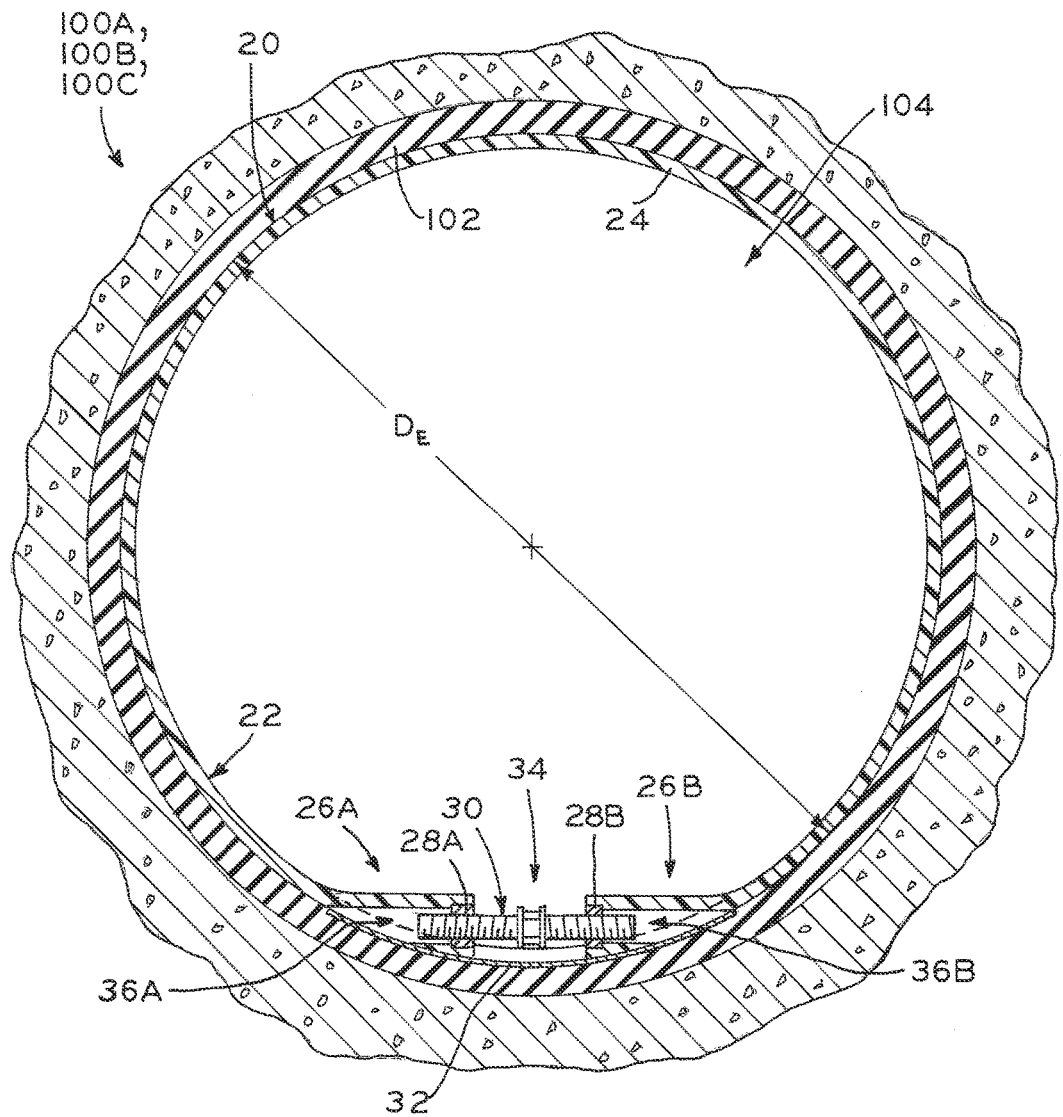
FIG. 12 is another plan, cross-sectional view of the annular opening shown in FIG. 11, in which the sealing assembly has been expanded into an installed configuration seated against the gasket.

Once the installer is satisfied with the position and configuration of gasket 102 and sealing assembly 20 with respect to opening 104, bolt 30 is actuated to reconfigure sealing assembly 20 into the expanded configuration of FIG. 12. As noted above, actuation of bolt 30 is accomplished by engaging wrench 41 (FIG. 5) with wrench engagement portion 38 of bolt 30 and rotating wrench 41 along direction R. This rotation advances threaded portions 42, 44 simultaneously outwardly from nuts 28A, 28B, respectively, thereby spreading threaded end portions 26A, 26B apart from one another. The resulting increase in the size of gap 34 from spacing $G_C$ to spacing $G_E$ (FIGS. 4 and 5) effectively expands the overall diameter of expansion band 22 from contracted diameter $D_C$ (FIG. 11) to expanded diameter $D_E$ (FIG. 12), thereby eliminating the annular gaps between the outer cylindrical surface of expansion band 22 and the adjacent inner surface of gasket 102, as well as the gaps between the outer cylindrical surface of gasket 102 and the adjacent inner surface of opening 104.

When sufficient radial outward force is applied by expansion band 22 upon gasket 102, a fluid tight seal is effected between sealing assembly 20 and gasket 102, and between gasket 102 and opening 104. As noted above, in order to maintain a consistent radial outward force in the vicinity of end portions 26A, 26B when bolt 30 is tightened, oversleeve 32 is provided prior to installation of sealing assembly 20 to provide a consistent cylindrical outer surface of sealing assembly 20. In the illustrated exemplary embodiment, 20 foot-pounds of torque applied to bolt 30 is sufficient to create a fluid tight seal around the entire periphery of sealing assembly 20.

In an exemplary embodiment, expansion band 22 is designed to be nearly exactly cylindrical and substantially free of internal stresses when in the contracted configuration of FIG. 11. This cylindrical profile in the contracted state facilitates installation of sealing assembly 20 into the confined space of opening 104, obviating any need to manually reshape any portion of expansion band 22 during initial placement of sealing assembly 20 and gasket 102. When sealing assembly 20 is subsequently reconfigured to the expanded state shown in FIG. 12, nuts 28A, 28B and bores 36A, 36B maintain coaxiality with longitudinal axis $A_N$ of bolt 30 as noted above. This maintained coaxiality, together with the expansion of the overall diameter of expansion band 22, propagates stresses into the material of expansion band 22. These stresses are greatest near the junction of arcuate band 24 and the respective end portions 26A, 26B, and therefore tend to urge the outer periphery of expansion band 22 into a slightly noncylindrical shape with a generally oblong or egg-shaped outer profile. However, as also noted above, the material and thickness of expansion band 22 is designed to bend and flex under pressure. The rigid inner surface of opening 104, which is typically substantially cylindrical, urges expansion band 22 back into a cylindrical shape as expansion band 22 expands.

Advantageously, the flexibility and pliability of the material from which expansion band 22 is formed facilitates the ability of expansion band 22 to retain its cylindricity under the pressures applied to it when expanded within opening 104. Stated another way, expansion band 22 is sufficiently pliable to react to the stresses imposed by expansion of sealing assembly 20 (and the opposing stresses exerted by the interior wall of opening 104) by conforming to the cylindrical inner profile of the opening to be sealed. This pliability ensures a fluid tight seal between sealing assembly 20 and gasket 102, and between gasket 102 and opening 104.

4. Expansion Band Manufacture

In an exemplary embodiment, expansion band 22 is monolithically formed as a single part by an injection molding process. Turning to FIG. 13, mold 200 adapted for such a process is illustrated in cross-section. Mold 200 includes cavity 202 which corresponds to the overall shape and dimensions of expansion band 22, except that cavity 202 is slightly larger than expansion band 22 to accommodate for material shrinkage as expansion band 22 cools after production. To create expansion band 22, molten or otherwise flowable material is injected into cavity 202 until cavity 202 is completely filled, and the material within cavity 202 is then allowed to slowly cool until hardened into expansion band 22. On the left-hand side of FIG. 13, mold 200 is shown ready to receive an injection of flowable material, while the right-hand side shows mold 200 after such flowable material has been injected and allowed to cool.

Mold 200 includes nut installation mechanisms 204A, 204B which facilitate the inclusion of nuts 28A, 28B, respectively, during the injection molding process. When the flowable material is injected into cavity 202, the material flows around nuts 28A, 28B and, when hardened, captures nuts 28A, 28B within threaded end portions 26A, 26B. Each of mechanisms 204A, 204B includes movable rod 206, which are axially movable by a small amount within rod holder 208. In one exemplary embodiment, rods 206 are axially movable with respect to rod holder 208 by 0.017 inches. Within their movable range, rods 206 are urged by springs 210 inwardly toward one another, and toward central block 212.

Prior to injecting molten and/or flowable material into cavity 202, nuts 28A, 28B are installed on respective movable rods 206. As illustrated, rods 206 include stepped down portion 214 sized to accommodate nuts 28A, 28B. Rods 206 are then moved into a molding position, in which nuts 28A, 28B are held in abutting relationship against central block 212 as shown on the left-hand side of FIG. 13. Because stepped down portion 214 is axially shorter than the axial extent of the threaded bores of nuts 28A, 28B, springs 210 urge each of nuts 28A, 28B into firm and consistent contact with central block 212.

Upon injection of molten material into cavity 202, such molten material flows around nuts 28A, 28B and into contact with central block 212, thereby creating gap 34 (FIG. 2) of expansion band 22. However, because nuts 28A, 28B are held into firm contact with central block 212, molten material does not flow around the axial end surface of nuts 28A. 28B in contact with central block 212. This arrangement creates a clean and flush surface including both the axial ends of nuts 28A, 28B and the terminal end surfaces 29A, 29B of threaded end portions 26A, 26B, respectively. Moreover, because the axial position of nuts 28A, 28B can be tightly controlled by interaction between mechanisms 204A, 204B and central block 212, the relative axial and spatial arrangement of the threaded bores of nuts 28A, 28B may be similarly precisely controlled, thereby ensuring proper thread alignment when bolt 30 is installed after molding. Once expansion band 22 has hardened, rod holders 208 can be retracted, thereby withdrawing rods 206 from the newly formed bores 36A, 36B while leaving nuts 28A. 28B in place as illustrated on the right-hand side of FIG. 13. Expansion band assembly can then be removed from cavity 202.

In an exemplary embodiment, bolt 30A including recess 52 may be used to facilitate installation thereof into the finished molded expansion band 22, by allowing a wrench to be received in bore 36B and quickly spun to seat bolt 30A within nuts 28A, 28B. Alternatively, it is contemplated that bolt 30 may be threadably received within nuts 28A, 28B prior to the injection of molten material into cavity 202. In this instance, bolt 30 is fully received into nuts 28A, 28B (as shown in FIG. 4) prior to injection, so that expansion band 22 can be molded in the contracted configuration as noted above. Bolt 30 may pass through central block 212, thereby preventing the flowable molten from contacting bolt 30. Upon completion of the molded expansion band 22 with bolt 30 attached, oversleeve 32 is attached to expansion band 22 at threaded end portions 26A, 26B to complete sealing assembly 20.

Sealing assembly 20, made in accordance with the foregoing, provides a low cost yet highly effective sealing assembly for inner annular surfaces of pipes, manholes or other annular structures. In addition, using molded materials such as polymers for expansion band 22 provides a non-rusting and non-degrading material for the harsh environments where sealing assembly 20 may be used. This low cost, corrosion resistant assembly may also provide fluid tight seals of comparable strength to similar arrangements made entirely of metal, particularly where material selection, material thickness, and overall part dimensions are maintained on a scale approximately in accordance with the foregoing disclosure. Accordingly, it is appreciated that sealing assembly 20 may be scaled up or scaled down evenly to accommodate applications in larger or small openings 104.

5. Alternative Sealing Assembly Applications

Although sealing assembly 20 is shown in FIG. 1 in an application used to secure gasket 102A within opening 104 in wall 134 of structure 132, sealing assembly 20 may also be used in many other applications. Moreover, the principles of the present design may be applied in any context in which a flexible structure is needed to impart a radial outward force upon an adjacent surface by selectively expanding the flexible structure.

Figure 14:
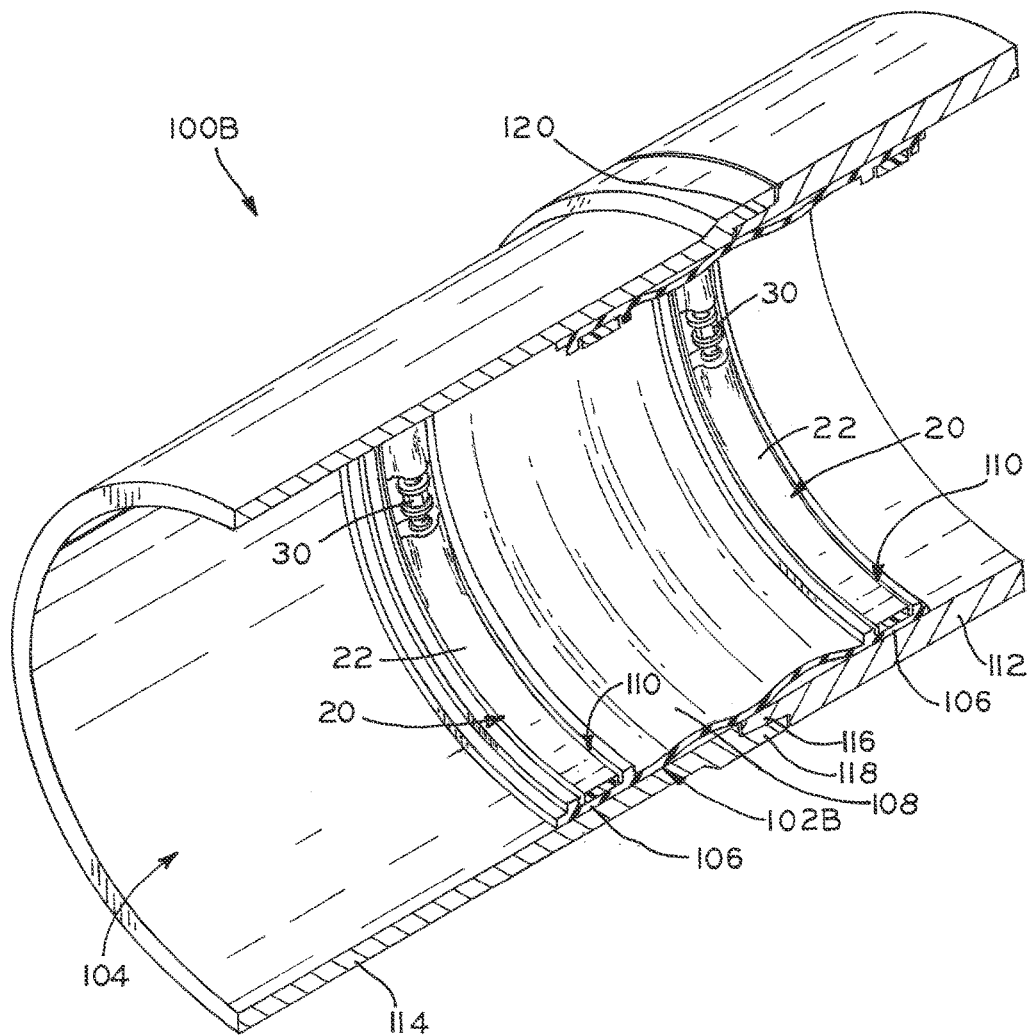
FIG. 14 is a perspective, cross-section view of a pipe-to-pipe connection having a gasket contained therein, in which the gasket is held in place by a pair of sealing assemblies in accordance with the present disclosure.
Figure 15:
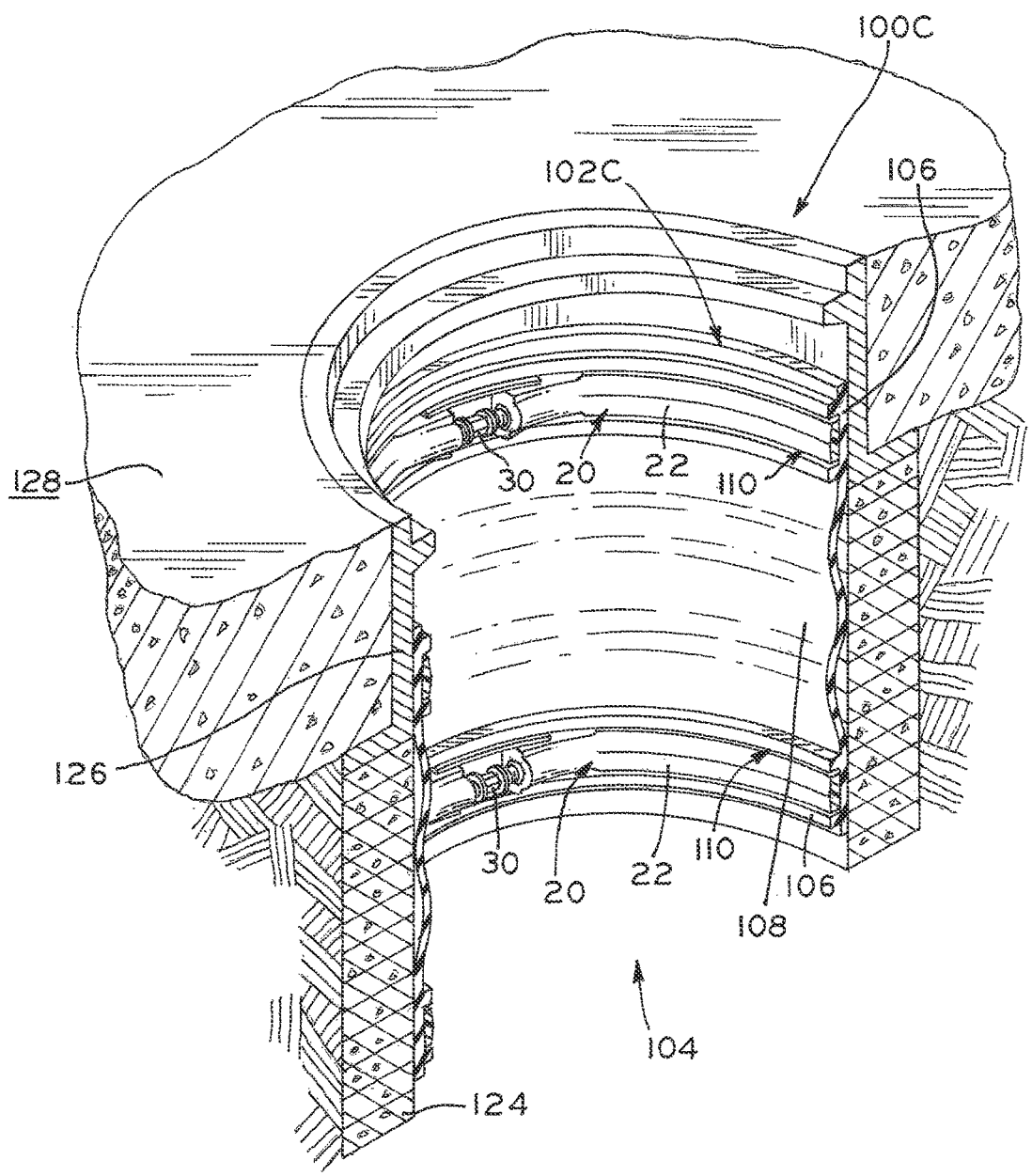
FIG. 15 is a perspective, cross-section view of a manhole frame and manhole base disposed beneath a pavement surface, in which a gasket is held in place by a pair of sealing assemblies in accordance with the present disclosure.

FIGS. 1, 14 and 15 respectively illustrate three potential applications for sealing assembly 20, including underground pipe systems and manholes. Each of these applications has a unique gasket 102A, 102B or 102C used in conjunction with sealing assembly 20 to effect a fluid-tight seal between an inner annular opening 104 and the adjacent material of gasket 102. For purposes of the present disclosure, "gasket 102" refers generically to any of gaskets 102A, 102B or 102C. Similarly, "opening 104" is used throughout the following descriptions, it being understood that opening 104 can take on a variety of sizes and configurations within the scope of the present disclosure. Moreover, sealing assembly 20 may be used in any application which generally involves the radial expansion of a flexible seal or gasket into sealing engagement with a rigid structure. The application illustrated in FIG. 1 is discussed in detail above. The details and operation of sealing assembly 20 in two alternative applications are discussed below.

Turning to FIGS. 14 and 15, a pair of sealing assemblies 20 are shown sealingly attaching respective axial ends of gaskets 102B, 102C to create a fluid-tight seal in pipe assembly 100B (FIG. 14) or manhole assembly 100C (FIG. 15). In the illustrated embodiments, generally cylindrically shaped gaskets 102B and 102C each include a pair of axially spaced sealing portions 106 connected by a bridge portion 108. Bridge portion 108 may include one or more undulations as shown in order to permit movement of sealing portions 106 toward and away from one another along their common axis, i.e., a longitudinal axis passing through the center of gasket 102B, 102C. Gaskets 102B, 102C may be made of extruded rubber, for example, in a manner in which a length of rubber section is extruded, and then is cut to a predetermined length, followed by splicing the ends of the section together to form the cylindrical gasket 102B or 102C. Gaskets 102B, 102C may also be made of a resilient plastic material by an injection molding process, for example.

Referring to FIG. 14, gasket 102B may be used with pipe assembly 100B to seal a defective primary seal in a pipe-to-pipe connection between pipe sections 112 and 114, such as the connection between spigot end 116 of pipe 112 and socket end 118 of pipe 114 in which a primary seal 120 is ineffective. Yet another alternative is to use sealing assemblies 20 with gasket 102 as a primary seal to seal pipe sections 112 and 114 upon initial connection and installation thereof, or to seal across a crack in pipes 112 and/or 114.

Gasket 102B is placed within the pipes 112 and 114 such that one sealing portion 106 is positioned adjacent spigot end 116 of pipe 112 and the other sealing portion 106 is positioned adjacent socket end 118 of pipe section 114, with bridge portion 108 of gasket 102B bridging the gap between pipe sections 112 and 114. Thereafter, sealing assemblies 20 are placed within respective expansion band seats 110 of gasket 102B, and bolts 30 of sealing assemblies 20 are actuated in the manner described above to outwardly radially compress sealing portions 106 into fluid tight sealing engagement with the inner surfaces of pipes 112, 114, respectively, thereby providing a fluid tight seal between pipes 112 and 114. After gasket 102B is so sealingly engaged with pipes 112 and 114, fluid can flow through opening 104 without causing fluid pressure and potential leakage at primary seal 120.

Referring to FIG. 15, a pair of sealing assemblies 20 are used to secure gasket 102C about an interface between manhole base 124 and a manhole frame 126 disposed beneath pavement surface 128. Specifically, an upper sealing assembly 20 is used to press an upper expansion band seat 110 of gasket 102C into sealing engagement with manhole frame 126, and a lower sealing assembly 20 is used to press a lower expansion band seat 110 of gasket 102C into sealing engagement with manhole base 124. In this manner, water infiltration into manhole base 124 is prevented, regardless of whether relative movement occurs between manhole frame 126 and manhole base 124.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A sealing assembly comprising:
an expansion band comprising:
an arcuate band portion defining a fluid flow path therethrough;
a pair of end portions monolithically formed with said arcuate band portion and disposed at opposing ends of said arcuate band portion;
a pair of first threaded components having opposing threads and respectively captured within said pair of end portions, wherein a profile of each of said pair of end portions progressively radially thickens from a substantially rectangular cross-section starting at respective junctions between said arcuate band portion and said pair of end portions and advancing toward a substantially round cross-section at respective terminal end surfaces of said expansion band; and
a second threaded component including oppositely-threaded ends respectively threadably engaged with said pair of first threaded components, such that rotation of said second threaded component in a first direction causes said pair of end portions to be simultaneously driven apart from one another to thereby expand a diameter of said arcuate band portion.

2. The sealing assembly of claim 1, wherein said expansion band is made of a nylon 66, 33% glass filled material with up to 1% polymer, such that said expansion band has a Young's modulus of between 3.0 GPa and 6.0 GPa.

3. The sealing assembly of claim 1, wherein said expansion band defines a contracted state and an expanded state, said expansion band having a nearly exactly cylindrical outer surface in said contracted state and a non-cylindrical outer surface in said expanded state.

4. The sealing assembly of claim 3, wherein said expansion band has an outer diameter of about 11.5 inches in said expanded state, such that said expansion band is suitable for use in a manhole riser with a 12-inch aperture and a ¼-inch thick gasket.

5. The sealing assembly of claim 1, further comprising an elastomeric gasket disposed around an outer surface of said expansion band.

6. The sealing assembly of claim 1, wherein rotation of said second threaded component in a second direction opposite said first direction causes said pair of end portions to be simultaneously drawn together to thereby contract said arcuate band portion.

7. The sealing assembly of claim 1, wherein said pair of end portions each includes a bore therethrough, said bore defining a longitudinal bore axis coaxial with a longitudinal component axis of said second threaded component when said second threaded component is threadably engaged with said pair of first threaded components.

8. The sealing assembly of claim 7, wherein each of said bores includes a shoulder formed therein, each of said pair of first threaded components captured within a respective one of said bores such that respective first axial ends of said pair of first threaded components each abut a respective one of said shoulders.

9. The sealing assembly of claim 8, wherein a second axial end of each of said pair of first threaded components is flush with a respective terminal end surface of one of said pair of end portions.

10. The sealing assembly of claim 7, wherein said bore extends through said pair of end portions through to the exterior surface of the expansion band, said second threaded component comprises:
- an installation tool engagement portion disposed at a terminal axial end of at least one of said oppositely-threaded ends, such that said installation tool engagement portion is accessible from an outer surface of the expansion band via said bore formed in said pair of end portions; and
- an adjustment tool engagement portion disposed axially between said oppositely-threaded ends, such that said adjustment tool engagement portion is accessible when said outer surface of said expansion band is covered.

11. The sealing assembly of claim 10, wherein the adjustment tool engagement portion is hex-shaped.

12. The sealing assembly of claim 1, further comprising an oversleeve received over said expansion band in the vicinity of said pair of end portions, said oversleeve comprising:
- a base portion having an inside surface adapted to be received upon an outer surface of said expansion band;
- a pair of sidewalls extending radially inwardly from said base portion to define mutually opposed, inwardly-facing surfaces;
- a pair of augmentations respectively spanning angular junctions between said inside surface of said base portion and said inwardly-facing surfaces of said pair of sidewalls.

13. The sealing assembly of claim 12, wherein said pair of augmentations occupy a space between respective terminal end surfaces of said pair of end portions when said oversleeve is received upon said outer surface of said expansion band.

14. The sealing assembly of claim 1, wherein:
- said pair of end portions each includes a bore therethrough, said bore defining a longitudinal bore axis coaxial with a longitudinal component axis of said second threaded component when said second threaded component is threadably engaged with said pair of first threaded components; and
- respective material thicknesses defined by said pair of end portions are substantially constant around each said bore, whereby said pair of end portions have a smooth and rounded outer surface.

15. The sealing assembly of claim 14, wherein:
- said arcuate band portion defines a band thickness along a radial direction;
- said respective material thicknesses defined by said pair of end portions are commensurate with said band thickness in the vicinity of said bores and throughout said end portions.

16. The sealing assembly of claim 14, wherein an overall flexural modulus of the material around each said bore is commensurate with a flexural modulus of said arcuate band portion, whereby consistent distribution of radial outward force is promoted when said sealing assembly is installed.

17. The sealing assembly of claim 1, wherein:
- said arcuate band portion defines a circular shape as viewed in profile; and
- said pair of end portions cooperate to define a substantially linear surface intersecting the circular shape of the arcuate band portion, as viewed in profile.

18. The sealing assembly of claim 17, wherein said substantially linear surface defines a chord line and said bores of said pair of end portions define a common longitudinal axis, said chord line substantially parallel to said longitudinal axis.

19. The sealing assembly of claim 1, wherein said oppositely-threaded ends of said second threaded component are respectively substantially encapsulated within the material of said pair of end portions of said expansion band, whereby only a central portion of said second threaded component are is exposed to material passing through said expansion band.

* * * * *

UNITED STATES PATENT AND TRADEMARK OFFICE
CERTIFICATE OF CORRECTION

PATENT NO. : 9,644,768 B2  
APPLICATION NO. : 13/799698  
DATED : May 9, 2017  
INVENTOR(S) : Skinner et al.

It is certified that error appears in the above-identified patent and that said Letters Patent is hereby corrected as shown below:

In the Claims

Claim 19, Column 16, Line 36, delete "are"

Signed and Sealed this
Fifth Day of September, 2017

Joseph Matal
*Performing the Functions and Duties of the*
*Under Secretary of Commerce for Intellectual Property and*
*Director of the United States Patent and Trademark Office*